United States Patent [19]

Amrath

[11] Patent Number: 4,571,110
[45] Date of Patent: Feb. 18, 1986

[54] BALL JOINT

[75] Inventor: Hans Amrath, Viersen, Fed. Rep. of Germany

[73] Assignee: TRW Ehrenreich GmbH & Co. KG, Düsseldorf, Fed. Rep. of Germany

[21] Appl. No.: 591,148

[22] Filed: Mar. 19, 1984

[30] Foreign Application Priority Data

Mar. 23, 1983 [DE] Fed. Rep. of Germany ....... 3310489

[51] Int. Cl.⁴ .................................. F16C 11/10
[52] U.S. Cl. .................................. 403/141; 403/143
[58] Field of Search ................. 403/141, 143, 142

[56] References Cited

U.S. PATENT DOCUMENTS

| | | | |
|---|---|---|---|
| 4,084,913 | 4/1978 | Scheuk | 403/141 |
| 4,111,570 | 9/1978 | Morel | 403/141 X |
| 4,200,405 | 4/1980 | Bauer | 403/142 |
| 4,311,405 | 1/1982 | Hawley | 403/142 |
| 4,386,949 | 6/1983 | Bassi | 403/141 X |
| 4,465,393 | 8/1984 | Dieckmann | 403/141 X |

FOREIGN PATENT DOCUMENTS

| | | |
|---|---|---|
| 1525177 | 9/1969 | Fed. Rep. of Germany . |
| 1625581 | 11/1971 | Fed. Rep. of Germany . |
| 1921769 | 11/1973 | Fed. Rep. of Germany . |
| 8031790 | 11/1980 | Fed. Rep. of Germany . |

Primary Examiner—Andrew V. Kundrat
Attorney, Agent, or Firm—Martin A. Faber

[57] ABSTRACT

A ball joint for connecting rod parts having a ball socket (1) of flexible plastic at the end of a shaft (2) in order to receive a ball head (4). In order to facilitate the assembling of the ball joint while retaining the customary pulling-out forces, it is proposed that a wall section of the ball socket (1) be developed as a yoke-shaped part (5, 12) developed in one piece thereon, which can be engaged together with the ball head (4) into the ball socket (1).

9 Claims, 9 Drawing Figures

BALL JOINT

BACKGROUND OF THE INVENTION

The invention relates to a ball joint for connecting rod parts having a ball socket for flexible plastic on the end of a shaft in order to receive a ball head.

In these known small joints it is important that the ball head be assembled with the ball socket without the expenditure of a large amount of force. For this purpose it has already been proposed in Federal Republic of Germany Pat. Nos. 15 25 177, 16 25 581 and 19 21 769 that the ball socket be developed as an open fork and that it be closed from the outside by a closure part developed as a yoke spring. In this known construction, the ball head is not completely encapsulated and the closure part increases the outside dimensions of the ball socket and can easily become loose from the ball socket if the material becomes fatigued and/or breaks in the region of its film hinge.

In another construction known from Federal Republic of Germany GM No. 80 31 790, it has been proposed that the assembling be facilitated by recesses arranged, spaced apart from each other, in the ball socket. This known solution, however, has the disadvantage that the ball head can very easily also slip out of the ball socket.

It is an object of the invention to create a ball joint of simple construction having a substantially closed ball socket, in which a securing element for the ball head is non-detachably injection molded and engages into the ball socket upon assembly with the ball head.

SUMMARY OF THE INVENTION

According to the invention, a wall element of the ball socket (1) is developed as a yoke-like part (5, 12) attached thereto in one piece of injection molding and engaged into the ball socket (1) together with the ball head (4).

In one partical embodiment, the part (5) can be provided on its free end with an anchoring head (7), having a securing projection (8), which engages into a corresponding recess (10) in the ball socket (1), the securing projection engaging into an undercut or detent (11).

Furthermore, the part (5) and the groove (9) can have corresponding trapezoidal cross sections.

The part (12) can, however, also consist of several, for instance two, wall sections (13, 14) which are connected together in hinge-like manner, one of which is contained in an opening (16) in the ball socket (1) while the other is formed thereon in the manner of a hinge and has a securing projection (15).

In both embodiments a ball joint developed in accordance with the invention has the advantage that the securing element for the ball head are injection molded in non-detachable manner on the ball socket and, upon assembling of the ball head, can be engaged together with the latter in the ball socket. In this way the assembling is considerably facilitated and simplified.

Furthermore, in accordance with the invention, in the assembled condition a pressure point (17) on the wall section (13) presses the securing projection (15) on the upper end of the wall section (14) into an undercut on the shaft (2).

With the above and other objects and advantages in view, the present invention will become more clearly understood in connection with the detailed description of preferred embodiments, when considered with the accompanying drawings, of which:

DETAILED DESCRIPTION OF THE PREFERRED EMBODIMENTS

Figure 1:
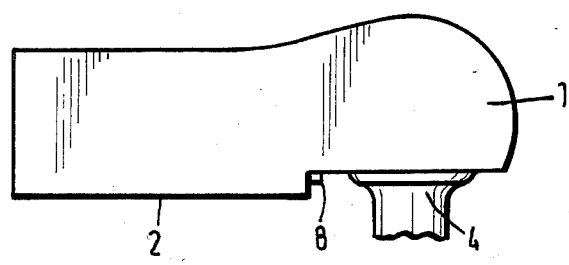
FIG. 1 is a side view of an assembled ball joint.
Figure 2:
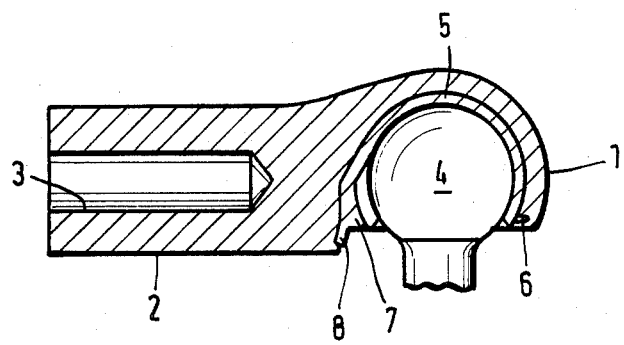
FIG. 2 is the same ball joint in longitudinal section.
Figure 3:
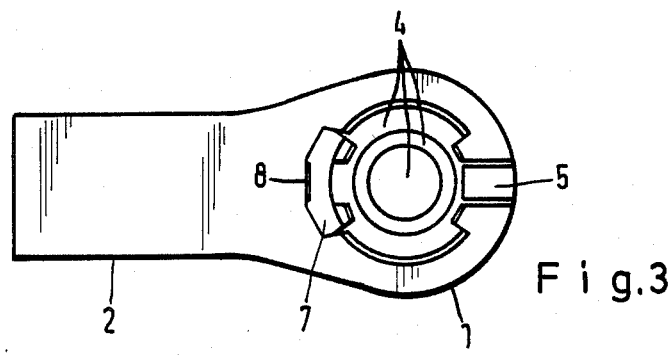
FIG. 3 is the same ball joint seen from below.
Figure 4:
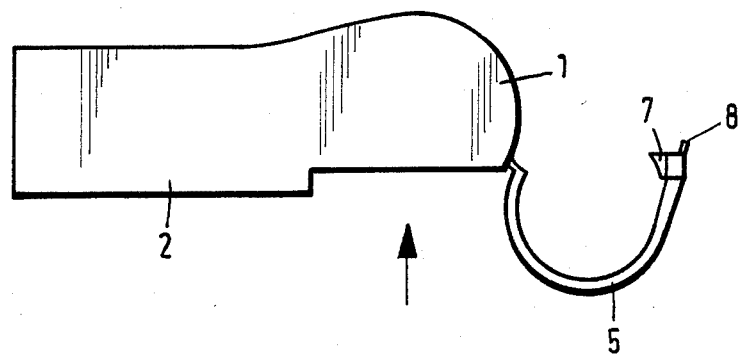
FIG. 4 is the ball socket without ball head and with the wall section swung out, seen in side view.
Figure 5:
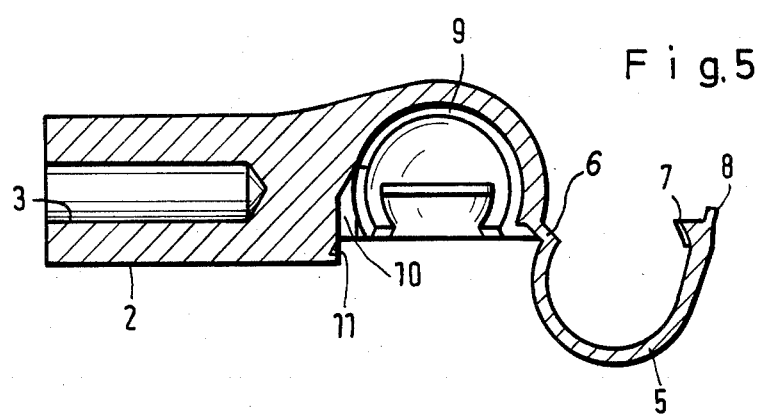
FIG. 5 is the same ball socket in longitudinal section.
Figure 6:
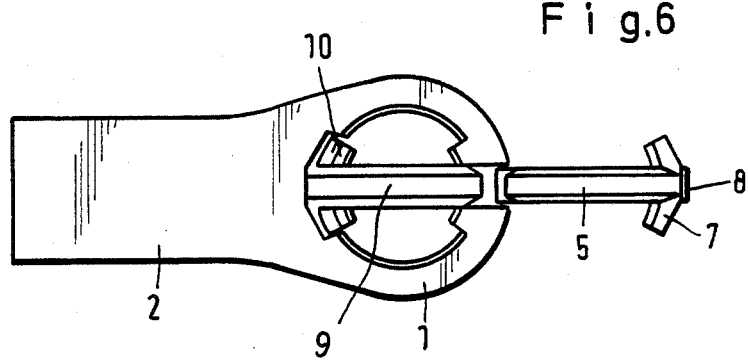
FIG. 6 is the same ball socket seen from below.

The ball socket 1 and shaft 2 consist of a single plastic part produced in an injection mold. The shaft 2 is provided on its free end with a bore 3 for the attachment of a rod (not shown). A ball head 4 can be inserted with elastic deformation into the ball socket 1.

In the embodiment shown in FIGS. 1 to 6, a radially encompassing wall section of the ball socket 1 is developed as a yoke-shaped part 5 of trapezoidal cross section, which is formed thereon as a single piece with a hinge strip 6. At its free end, the part 5 has a T-shaped anchoring head 7 having a securing projection 8. In order that the part 5 can be inserted together with the ball head 4 into the ball socket 1 and then secure the ball head 4 in the ball socket 1, a groove 9 of trapezoidal cross section corresponding to the part 5, a recess 10 corresponding to the anchoring head 7 and a notch 11 corresponding to the securing projection 8 are provided in the ball socket 1.

In the assembled condition, the part 5 surrounds the ball head 4 and holds it firmly in the ball socket 1 by means of the anchoring head 7 and the securing projection 8.

Figure 7:
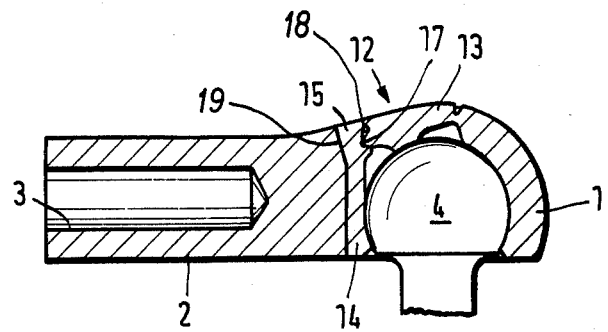
FIG. 7 is a different embodiment of an assembled ball joint, in longitudinal section.
Figure 8:
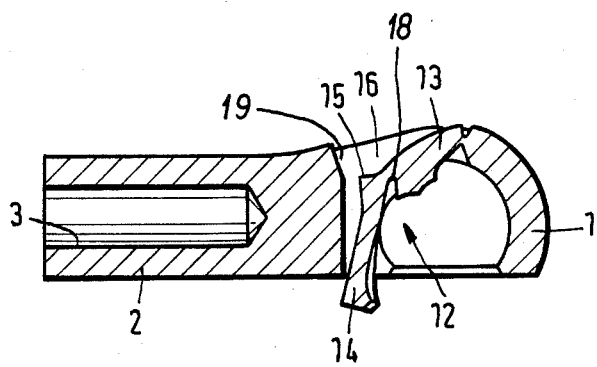
FIG. 8 is the ball socket of the ball joint of FIG. 7 without ball head before assembly, seen in longitudinal section.
Figure 9:
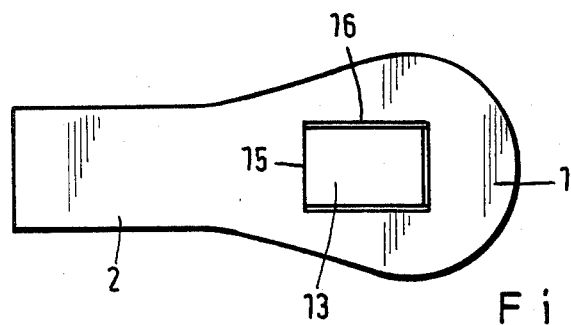
FIG. 9 is the assembled ball joint of FIG. 7 seen in top view.

In the embodiment shown in FIGS. 7 to 9, a part 12 of the ball socket 1 consists of two wall sections 13, 14 connected in hinge-like manner to each other, one of them being also provided with a securing projection 15. For the swinging-in of the wall sections 13, 14 an opening 16 is provided in the ball socket 1. In this embodiment also, the part 12, after assembly, rests against the ball head 4 and holds it firmly in the ball socket 1.

A pressure point 17 on the wall section 13 digs into the wall element 14 upon assembly so as to form a compactly clamped unit with the projection 15, which unit, in its turn, secures the wall element 14 against being pulled out if a pulling force is exerted on the ball head 4.

In the embodiment shown in FIGS. 7 to 9, sealing lips or films can be arranged on the two longitudinal edges of the wall section 13 and/or on the longitudinal edges of the opening 16, closing off the free spaces between the wall section 13 and the opening 16 and thus protecting the ball joint from dirt, dust or the like from the outside.

In order to achieve a locked unit and retain it in the event of pull on the pin, the predetermined inclined position of the contact surface between projection 15 and shaft 2 in combination with the position of the center point on the hinge strip 18 must be a very specific one in order to achieve the desired wedge action! For this purpose, the angle between a tangent drawn from the hinge strip 18 to the ball head and the undercut 19 on the shaft 2 is made greater than 90°.

Of course, in this embodiment in the same way as in FIGS. 1 to 6, a securing projection 8 for a notch 11 can also be arranged at the lower end of the wall section 14.

I claim:

1. A ball joint for connecting parts, the ball joint comprising
   a ball socket made of flexible plastic, the ball socket being adapted to receive a ball head, and wherein
   said ball socket has a wall section formed as a yoke-like part formed in one piece with another portion of the ball socket,
   said yoke-like part is releasably engageable into said another portion of the ball socket together with the ball head therein,
   said yoke-like part has a free end and is formed on said free end thereof with an anchoring head having a securing projection,
   said another portion of said ball socket is formed with a recess and a detent,
   said recess corresponds to said anchoring head, the latter being engageable into said recess,
   said securing projection is engageable into said detent,
   said detent is a notch formed in said another portion of said ball socket adjacent said recess.

2. A ball joint for connecting parts, the ball joint comprising
   a ball socket made of flexible plastic, the ball socket being adapted to receive a ball head, and wherein
   said ball socket has a wall section formed as a yoke-like part formed in one piece with another portion of the ball socket,
   said yoke-like part is releasably engageable into said another portion of the ball socket together with the ball head therein,
   said another portion of said ball socket is formed with a groove in which said yoke-like part engages, and
   said yoke-like part and said groove have corresponding trapezoidal cross sections.

3. A ball joint for connecting parts, the ball joint comprising
   a ball socket made of flexible plastic, the ball socket being adapted to receive a ball head, and wherein
   said ball socket has a wall section formed as a yoke-like part formed in one piece with another portion of the ball socket,
   said yoke-like part is releasably engageable into said another portion of the ball socket together with the ball head therein,
   said another portion of the ball socket forms an opening,
   said wall section formed as said yoke-like part comprises at least two wall sections which are connected together in hinge-like manner,
   one of said two wall sections closes said opening formed in said another portion of the ball socket, and
   the other of said two wall sections has a securing projection releasably engageable with said another portion of said ball socket.

4. The ball joint according to claim 3, wherein
   said securing projection is formed on an end of said other wall section adjacent said one wall section,
   said another portion of said ball socket is formed with an undercut,
   said one wall section has a pressure point,
   said pressure point, in the engaged condition of said yoke-like part in said another portion of said ball socket, presses said securing projection of said other wall section into said undercut.

5. The ball joint according to claim 4, further comprising
   a hinge strip hingedly connects said two wall sections, and
   said pressure point and said securing point are adjacent said hinge strip,
   the angle between a tangent drawn from the hinge strip to the ball head and the undercut is greater than 90°.

6. The ball joint according to claim 3, wherein
   said wall section is injection molded in one piece with said another portion of the ball socket.

7. The ball joint according to claim 3, further comprising
   a shaft,
   said ball socket is formed at an end of said shaft,
   said securing projection is formed on an end of said other wall section adjacent said one wall section,
   said shaft is formed with an undercut at an end of said opening,
   said one wall section has a pressure point,
   said pressure point, in the engaged condition of said yoke-like part in said another portion of said ball socket with said one wall section in said opening, presses said securing projection of said other wall section into said undercut.

8. The ball joint according to claim 3, wherein
   said yoke-like part and said another portion of said ball socket are formed with cooperating releasably engageable detent means for engaging said yoke-like part in said another portion of said ball socket so that said yoke-like part is held in such a manner around said ball head in cooperation with said another portion of said ball socket that said ball head is securely held in said ball socket.

9. The ball joint according to claim 8, wherein
   said yoke-like part is resiliently releasable from said ball head when said yoke-like part is released from said another portion of said ball socket.

* * * * *